US 6,265,686 B1

(12) United States Patent
Lai

(10) Patent No.: US 6,265,686 B1
(45) Date of Patent: Jul. 24, 2001

(54) DISCHARGE PROCESSING MACHINE HAVING AN IMPROVED ASSEMBLY STRUCTURE OF MAIN SHAFT SEAT

(76) Inventor: Ton-Shih Lai, No. 52-26, Kuang Min Road, Hsi Tun Area, Taichung (TW)

( * ) Notice: Subject to any disclaimer, the term of this patent is extended or adjusted under 35 U.S.C. 154(b) by 0 days.

(21) Appl. No.: 09/449,358

(22) Filed: Nov. 24, 1999

(51) Int. Cl.⁷ ....................................................... B23H 7/30
(52) U.S. Cl. .................................. 219/69.11; 204/224 M; 219/69.2
(58) Field of Search ................................ 219/69.16, 69.2, 219/69.11; 408/124, 128, 129, 137; 205/605; 204/224 M

(56) References Cited

U.S. PATENT DOCUMENTS 5,848,863 * 12/1998 Liao ...................................... 408/128

FOREIGN PATENT DOCUMENTS 63-109919 * 5/1988 (JP).
9-94719 * 4/1997 (JP).

* cited by examiner

Primary Examiner—Geoffrey S. Evans
(74) Attorney, Agent, or Firm—Browdy and Neimark

(57) ABSTRACT

A discharge processing machine includes a base, a work platform, a machine head seat, a fixation seat, and a main shaft seat. The work platform is slidably mounted on the base. The machine head seat is mounted on one side of the base and is provided with a fixation arm, which is fastened at one end thereof with the fixation seat. The main shaft seat is slidably mounted on the fixation seat such that the main shaft seat slides along the direction of the normal line of the work platform. The fixation seat has a threaded hole, whereas the main shaft seat has a threaded rod which is driven by a servomotor to engage with various depths of the threaded hole of the fixation seat, so as to actuate the main shaft seat to displace along the direction of the normal line of the work platform.

4 Claims, 6 Drawing Sheets

DISCHARGE PROCESSING MACHINE HAVING AN IMPROVED ASSEMBLY STRUCTURE OF MAIN SHAFT SEAT

FIELD OF THE INVENTION

The present invention relates generally to a discharge processing machine, and more particularly to a discharge processing machine having an improved assembly structure of a main shaft seat.

BACKGROUND OF THE INVENTION

As shown in FIGS. 1 and 2, a discharge processing machine 10 of the prior art comprises a machine base 11, a work platform 12 mounted at the front end of the machine base 11 such that the work platform 12 is capable of sliding horizontally along the XY axes, a machine head seat 13 mounted on the rear end of the machine base 11 and provided with a fixation arm 14 extending toward the Y axis of the machine base 11. The fixation arm 14 is provided at the front end thereof with a connection portion 14A which is provided at the top thereof with a servomotor 14B. A fixation seat 15 is fastened with the front end of the connection portion 14A and is provided at the top end thereof with a fixation plate support 15A with a belted wheel 15B being pivoted thereto such that the belted wheel 15B is connected with the rotary shaft 14C of the servomotor 14B by a belt 15C. A main shaft seat 16 is mounted on the fixation seat 15 such that the main shaft seat 16 is capable of sliding along the Z axis corresponding to the normal line of the work platform 12. The main shaft seat 16 is provided with a nut 16A engaging a threaded rod 16B which is fastened at one end thereof with the center of the belted wheel 15B. The threaded rod 16B is actuated by the servomotor 14B to turn clockwise or counterclockwise, so as to control the position of the main shaft seat 16 moving along the Z axis to facilitate the fastening of the lower end of the main shaft seat 16 with a discharge processing head (not shown in the drawings). A workpiece (not shown in the drawings) fixed on the work platform 12 can be thus processed.

Such a prior art discharge processing machine 10 as described above is defective in design in that the servomotor 14B is mounted on the top of the connection portion 14A of the fixation arm 14, and that the belted wheel 15B is actuated by the servomotor 14B to turn to control the advancing of the main shaft seat 16. In light of the belted wheel 15B being mounted in the fixation plate support 15A, the underside of the fixation plate support 15A forms an upper dead point of the moving range of the main shaft seat 16. With a view to increasing the moving range of the main shaft of the prior art discharge processing machine 10, the main shaft seat 16, the threaded rod 16B, the connection portion 14A, and the fixation seat 15 are all increased in length so as to enable the top of the connection portion 14A and the fixation plate support 15A to have a higher horizontal position to facilitate the assembly of the servomotor 14B and the belted wheel 15B at the expense of the material cost as well as the processing cost. In addition, the processing machine 10 is so cumbersome that it must be disassembled to facilitate the shipping of the processing machine 10. On arrival at the shipping destination, the processing machine 10 must be assembled and calibrated at additional cost.

SUMMARY OF THE INVENTION

The primary objective of the present invention is to provide a discharge processing machine with a main shaft which can be increased in its moving range without a corresponding increase in length of the connection portion of the fixation arm and the fixation seat.

It is another objective of the present invention to provide a discharge processing machine which has a relatively lower erection height to facilitate the shipping of the discharge processing machine.

In keeping with the principle of the present invention, the foregoing objectives of the present invention are attained by a discharge processing machine comprising a base, a work platform, a machine head seat, a fixation seat, and a main shaft seat. The work platform is slidably mounted on the base. The machine head seat is mounted on one side of the base and is provided with a fixation arm. The fixation seat is fastened with one end of the fixation arm. The main shaft seat is slidably mounted on the fixation seat such that the main shaft seat slides along the direction of the normal line of the work platform. The fixation seat has a threaded hole, whereas the main shaft seat is provided with a threaded rod which is pivotally fastened therewith and is engaged with the threaded hole of the fixation seat. The threaded rod is driven by a servomotor mounted in the main shaft seat. The depth in which the threaded rod is engaged with the threaded hole can be thus changed so as to actuate the main shaft seat to displace along the direction of the normal line of the work platform and relative to the fixation seat.

The foregoing objectives, features, and functions of the present invention will be more readily understood upon a thoughtful deliberation of the following detailed description of a preferred embodiment of the present invention with reference to the accompanying drawings.

DETAILED DESCRIPTION OF THE INVENTION

Figure 1:
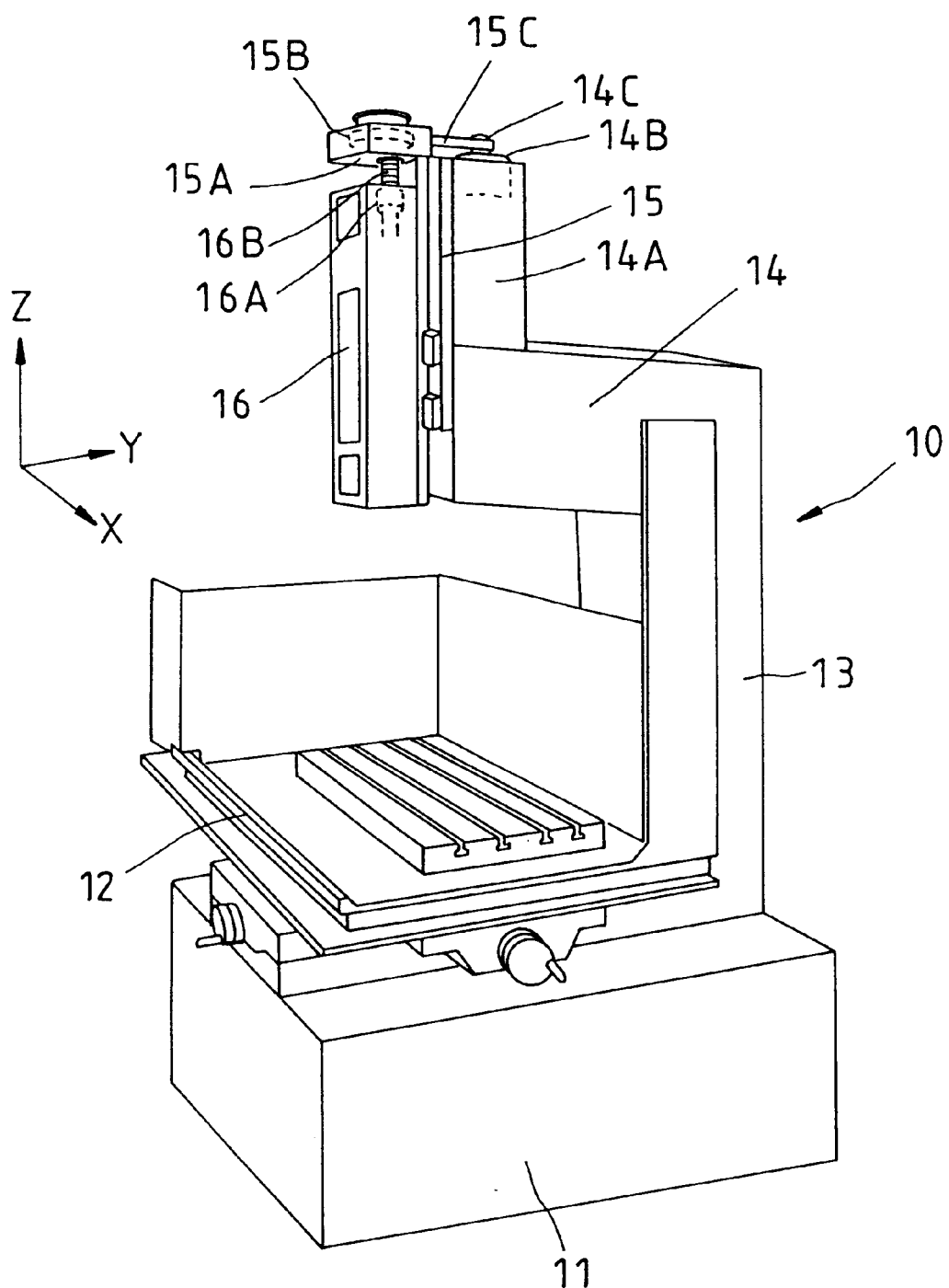
FIG. 1 shows a perspective view of a discharge processing machine of the prior art.
Figure 2:
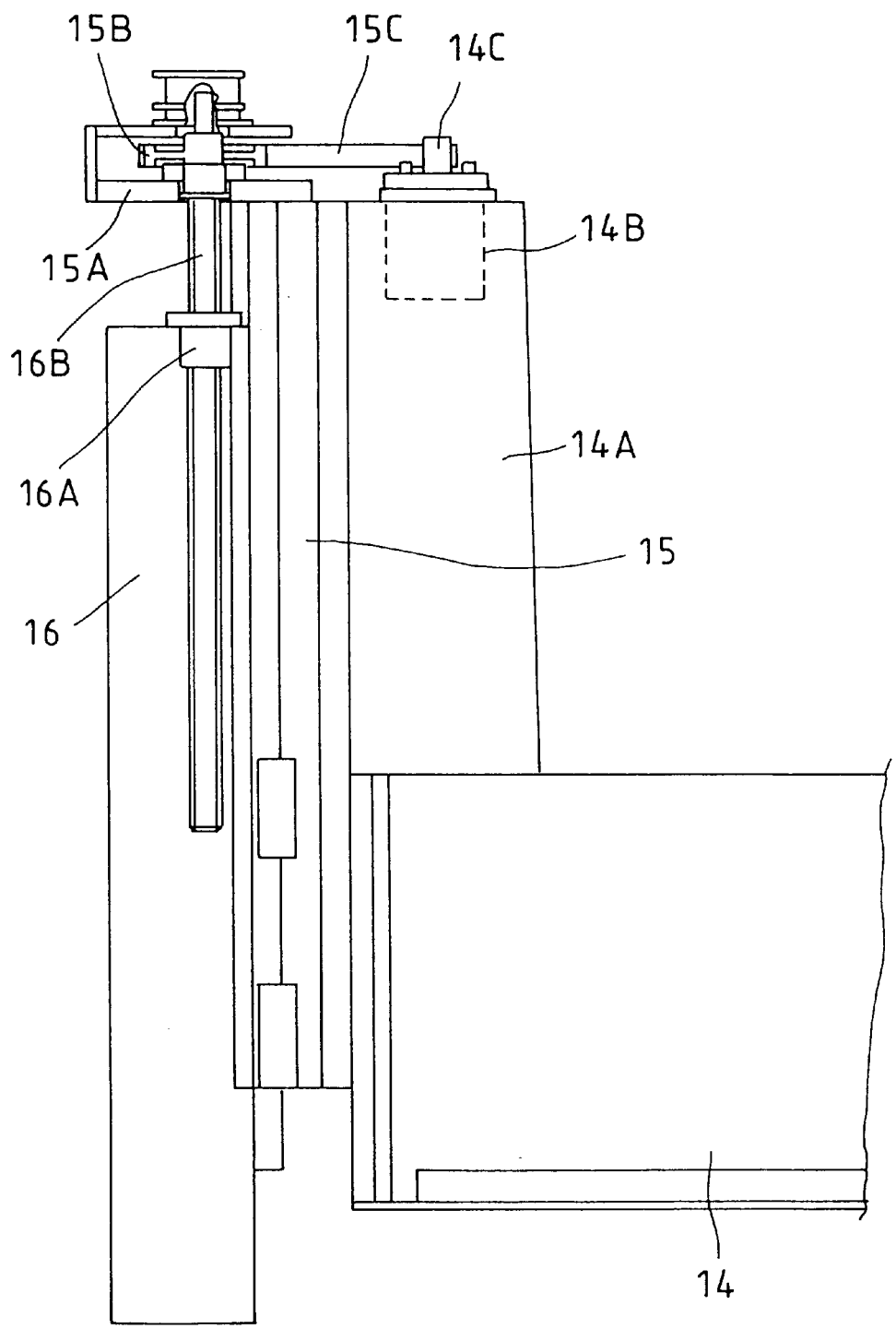
FIG. 2 shows a partial sectional view of the discharge processing machine of the prior art.
Figure 3:
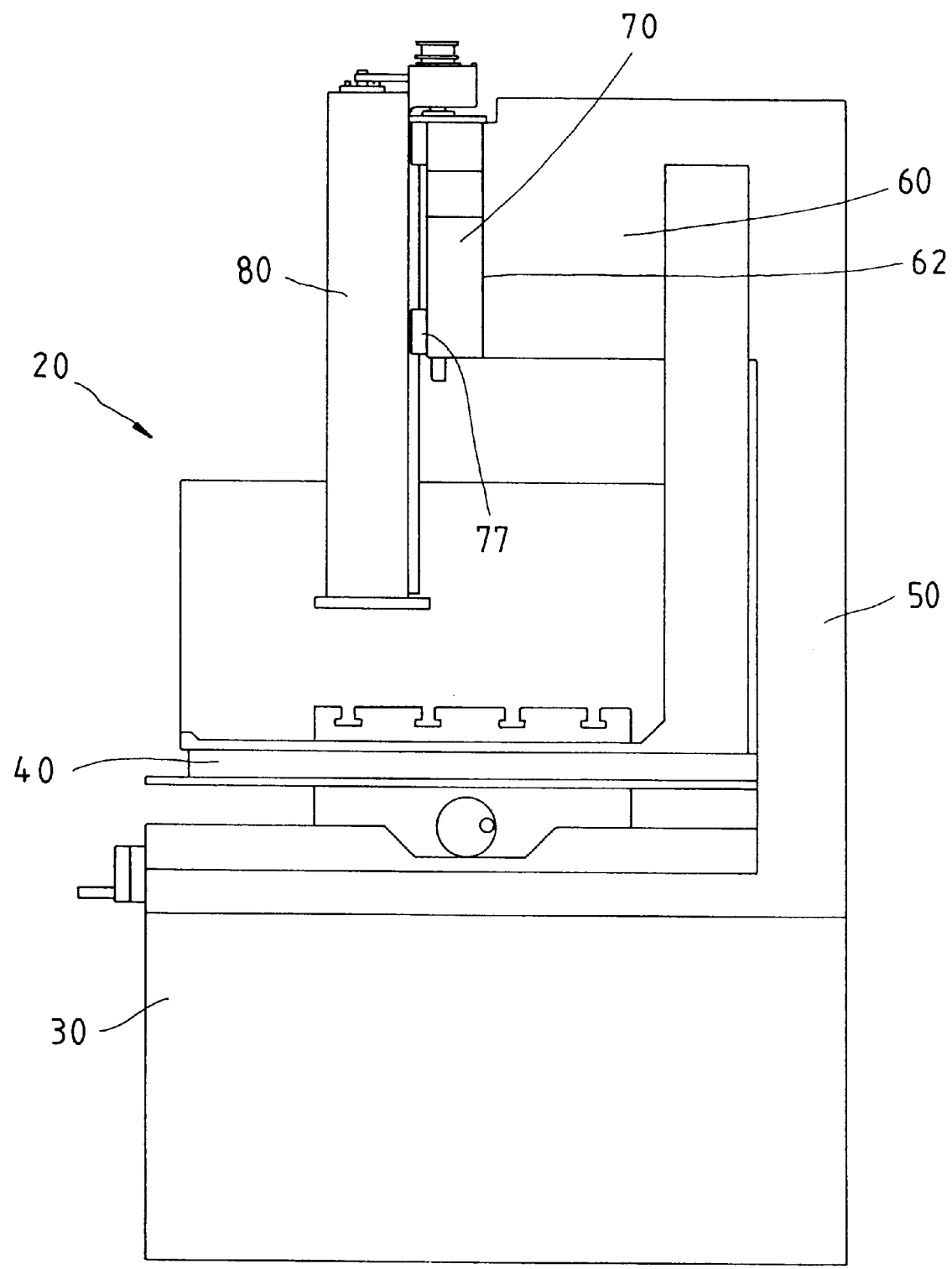
FIG. 3 shows a side view of the preferred embodiment of the present invention.
Figure 4:
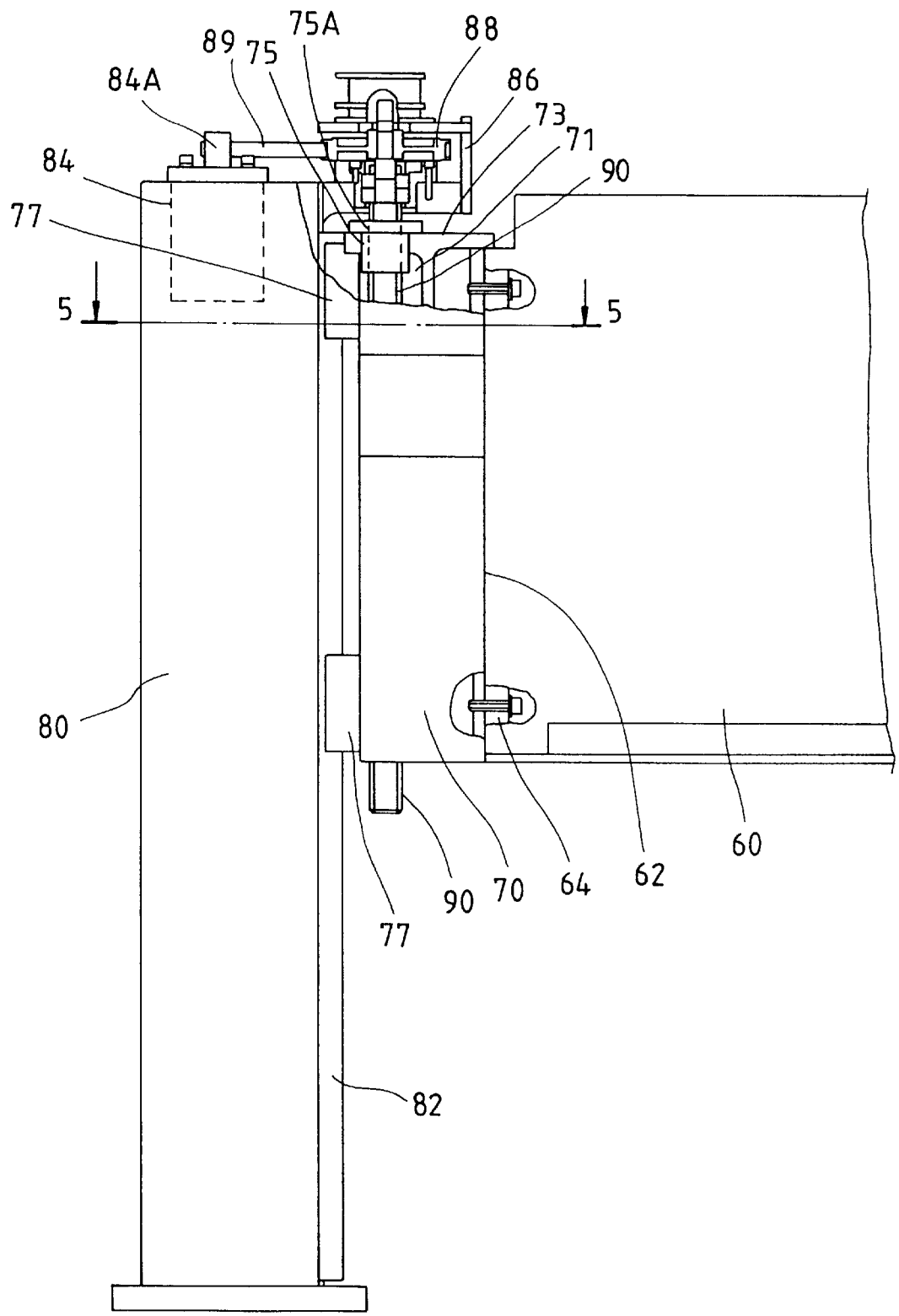
FIG. 4 shows a partial sectional view of the preferred embodiment of the present invention.
Figure 5:
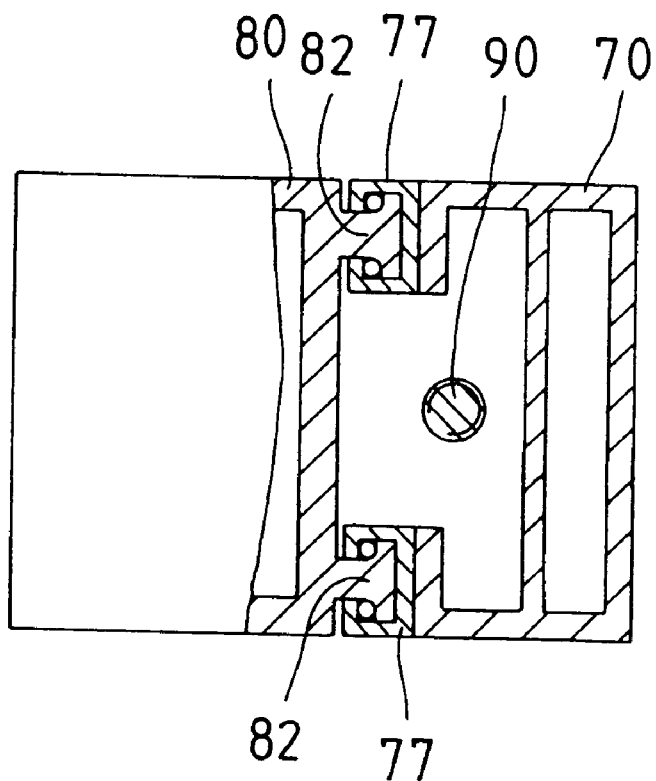
FIG. 5 shows a sectional view taken along the direction indicated by a line 5—5 as shown in FIG. 4.

As shown in FIGS. 3–5, a discharge processing machine 20 of the preferred embodiment of the present invention comprises a base 30, a work platform 40, a machine head seat 50, a fixation arm 60, a fixation seat 70, and a main shaft seat 80.

The base 30 is used for mounting other component parts of the discharge processing machine 20. The work platform 40 is mounted on the base 30 such that the work platform 40 is controlled manually or by a servo-mechanism, and that the work platform 40 is capable of horizontal displacement along the X or Y axis and relative to the base 30. The work platform 40 is intended to hold a workpiece which is to be processed.

The machine head seat 50 is fastened with the rear side of the base 30 and is provided with the fixation arm 60 extending toward the front side (the Y-axis direction) of the base 30. The fixation arm 60 is provided at the front end thereof with a connection portion 62, which is fastened with the fixation seat 70 by a plurality of bolts 64. The base 30, the work platform 40, the machine head seat 50, and the fixation arm 60 are similar in construction to those of the discharge processing machine of the prior art.

The discharge processing machine 20 of the present invention is characterized by the fixation seat 70 and the main shaft seat 80. The fixation seat 70 is of a rectangular frame and is provided therein with a receiving compartment 71. The fixation seat 70 has a top portion 73 which is provided with a nut 75 fastened therewith. The nut 75 is provided with a threaded hole 75A in communication with the receiving compartment 71. The fixation seat 70 is provided in the front side thereof with four slide rail seats 77, which are arranged in two parallel groups, with each having two slide rail seats 77.

The main shaft seat 80 is of a rectangular construction and is provided respectively in two long sides thereof with a rail 82, which is disposed in the slide rail seat 77 so as to enable the main shaft seat 80 to slide along the Z-axis direction and relative to the fixation seat 70. The Z-axis direction is corresponding to the normal line direction of the work platform 40. The main shaft seat 80 is provided at the top thereof with a servomotor 84 having an upright output shaft 84A. The main shaft seat 80 is further provided at the top of the rear side thereof with a fixation plate support 86 extending horizontally in the direction toward the fixation seat 80 such that the fixation plate support 86 is pivoted with a belted wheel 88 which is connected with the output shaft 84A of the servomotor 84 by a belt 89. The belted wheel 88 is fastened at the center thereof with a transmission threaded rod 90, which is engaged with threaded hole 75A of the fixation seat 70. The transmission threaded rod 90 is driven by the servomotor 84 to turn clockwise or counterclockwise via the belt 89 and the belted wheel 88. As a result, the transmission threaded rod 90 can be adjustably engaged in various depths of the threaded hole 75A.

Figure 6:
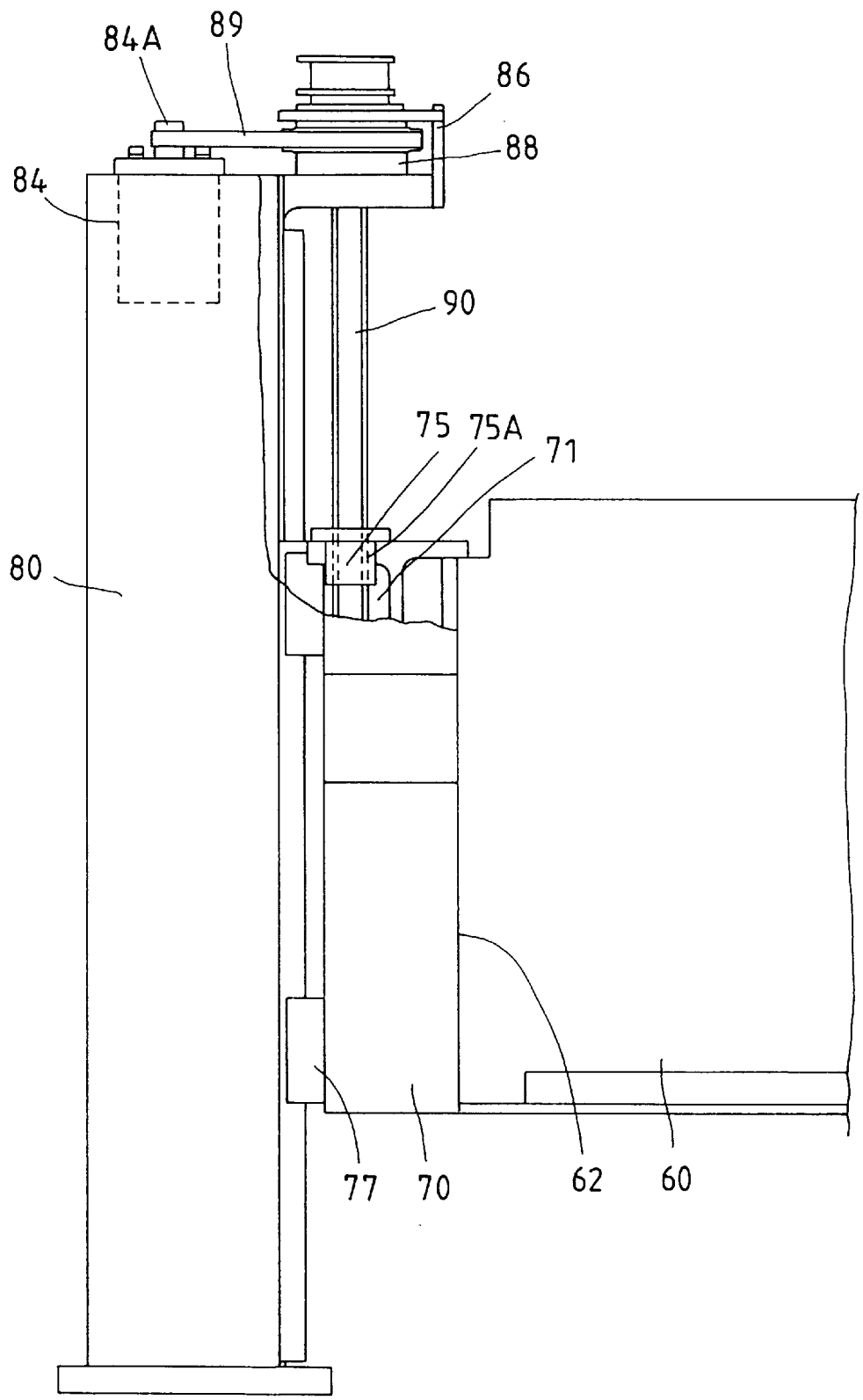
FIG. 6 is a side view illustrating the displacement of the main shaft seat of the preferred embodiment of the present invention.

In view of the nut 75 being fastened in the fixation seat 70, the main shaft seat 80 is actuated by the transmission threaded rod 90 to slide along the Z-axis direction and relative to the fixation seat 70 at such time when the transmission threaded rod 90 is engaged in various depths of the threaded hole 75A, as shown in FIG. 6. As a result, the axial position of the main shaft seat 80 can be controlled by the servomotor 84, so as to facilitate the processing of the workpiece (not shown in the drawing) by a discharge processing head (not shown in the drawing) which is fastened with the lower end of the main shaft seat 80.

In light of the top of the fixation seat 70 being the lower dead point of the displacement range of the main shaft seat 80, an increase in the lengths of the main shaft seat 80 and the threaded rod 90 will result in an increase in the displacement range of the main shaft seat 80, without having to increase the heights of the connection portion 62 of the fixation arm 60 and the fixation seat 70. As a result, the material cost and the process cost are substantially reduced. In addition, the main shaft seat 80 can be lowered to locate at the lower dead point of the displacement range of the main shaft seat 80 to lower the overall erection height of the discharge processing machine 20, so as to facilitate the shipping of the machine 20.

The embodiment of the present invention described above is to be regarded in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A discharge processing machine comprising:

a base;

a work platform mounted on said base such that said work platform slides horizontally in relation to said base;

a machine head seat mounted on one side of said base and provided with a fixation arm fastened therewith;

a fixation seat fastened with one end of said fixation arm; and a main shaft seat mounted on said fixation seat such that said main shaft seat slides along the direction of a normal line of said work platform;

wherein said fixation seat is provided with a threaded hole; wherein said main shaft seat is provided with a threaded rod fastened pivotally therewith whereby said threaded rod is driven by a servomotor mounted in said main shaft seat to engage with various depths of said threaded hole of said fixation seat, so as to actuate said main shaft seat to displace along the direction of the normal line of said work platform.

2. The discharge processing machine as defined in claim 1, wherein said main shaft seat is provided with a belted wheel fastened pivotally therewith such that one end of said threaded rod is fastened with a center of said belted wheel whereby said belted wheel is linked with an output shaft of said servomotor by a transmission belt.

3. The discharge processing machine as defined in claim 2, wherein said fixation seat has a plurality of slide rail seats, with each having an axis parallel to the normal line of said work platform; wherein said main shaft seat has at least one rail whereby said rail is disposed in said slide rail seats to enable said main shaft seat to displace along the direction of the normal line of said work platform at such time when said threaded rod is driven by said servomotor.

4. The discharge processing machine as defined in claim 1, wherein said threaded hole of said fixation seat is formed in a nut whereby said nut is fastened with said fixation seat.

* * * * *